United States Patent
Yoon et al.

(10) Patent No.: US 12,524,944 B2
(45) Date of Patent: Jan. 13, 2026

(54) GENERATING THREE-DIMENSIONAL LOOPING ANIMATIONS FROM STILL IMAGES

(71) Applicant: Adobe Inc., San Jose, CA (US)

(72) Inventors: Jae Shin Yoon, San Jose, CA (US); Duygu Ceylan Aksit, Mountain View, CA (US); Yangtuanfeng Wang, London (GB); Jingwan Lu, Santa Clara, CA (US); Jimei Yang, Merced, CA (US); Zhixin Shu, San Jose, CA (US); Chengan He, New Haven, CT (US); Yi Zhou, Los Angeles, CA (US); Jun Saito, Seattle, WA (US); James Zachary, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 306 days.

(21) Appl. No.: 18/340,445

(22) Filed: Jun. 23, 2023

(65) Prior Publication Data
US 2024/0428491 A1    Dec. 26, 2024

(51) Int. Cl.
G06T 13/40    (2011.01)
(52) U.S. Cl.
CPC .................... *G06T 13/40* (2013.01)
(58) Field of Classification Search
CPC ........ G06T 13/00; G06T 13/20; G06T 13/40; G06T 11/001; G06N 3/02
See application file for complete search history.

(56) References Cited

U.S. PATENT DOCUMENTS

| | | | | |
|---|---|---|---|---|
| 5,999,195 | A * | 12/1999 | Santangeli | G06T 13/80 |
| | | | | 345/473 |
| 11,830,121 | B1 * | 11/2023 | Starke | G06N 3/006 |
| 2020/0410736 | A1 * | 12/2020 | Lu | G06N 3/047 |

FOREIGN PATENT DOCUMENTS

GB    2606423 A  * 11/2022  ............ G06V 20/20

OTHER PUBLICATIONS

He, Chengan, et al. "NeMF: Neural Motion Fields for Kinematic Animation." arXiv preprint arXiv:2206.03287 (2022).
Yoon, Jae Shin, et al. "Learning Motion-Dependent Appearance for High-Fidelity Rendering of Dynamic Humans from a Single Camera." Proceedings of the IEEE/CVF Conference on Computer Vision and Pattern Recognition. 2022.

* cited by examiner

*Primary Examiner* — Antonio A Caschera
(74) *Attorney, Agent, or Firm* — Keller Preece PLLC

(57) ABSTRACT

A system that utilizes neural networks to generate looping animations from still images. The system fits a 3D model to a pose of a person in a digital image. The system receives a 3D animation sequence that transitions between a starting pose and an ending pose. The system generates, utilizing an animation transition neural network, first and second 3D animation transition sequences that respectively transition between the pose of the person and the starting pose and between the ending pose and the pose of the person. The system modifies each of the 3D animation sequence, the first 3D animation transition sequence, and the second 3D animation transition sequence by applying a texture map. The system generates a looping 3D animation by combining the modified 3D animation sequence, the modified first 3D animation transition sequence, and the modified second 3D animation transition sequence.

20 Claims, 12 Drawing Sheets

GENERATING THREE-DIMENSIONAL LOOPING ANIMATIONS FROM STILL IMAGES

BACKGROUND

Recent years have seen significant advancements in computer-implemented models for creating image animation. Due to the prevalence, ease of use, and capability of image editing software, it is common for users to edit images and videos. Images, particularly images posted online, are modified into videos to create interest and engagement with online posts. Unfortunately, it is difficult to alter two-dimensional ("2D") images into a three-dimensional ("3D") animation that reflects physically plausible movement in a specified motion type. For example, it is possible to animate 2D images by applying 2D rigging on an image and interpolating 2D joints, but these images are often not physically plausible. As an additional complication, it is challenging to create a plausible 3D looping animation sequence from a specified initial pose. Indeed, although techniques exist for creating 3D animation sequences from a variety of starting positions, it is challenging to generate a new animation sequence that starts from a user specified initial pose in a plausible fashion. Accordingly, the state of the art has a number of shortcomings with regard to flexibility, accuracy, and efficiency when generating looping 3D animation sequences.

SUMMARY

This disclosure describes one or more embodiments of systems, methods, and non-transitory computer readable media that solve one or more problems in the art with a looping 3D animation system that creates realistic looping animations from a single still image. The looping 3D animation system integrates an animation transition neural network and an animation rendering neural network to produce results that provide physically plausible and diverse looping animations. The looping 3D animation system utilizes a 3D body model to represent complex body movements, which allows for the creation of diverse human animation. Additionally, the looping 3D animation system utilizes a neural in-betweening method with data-driven motion priors for non-linear human motion interpolation between a static pose and query motion, which allows modeling realistic human body movements in a loop. Furthermore, the looping 3D animation system utilizes a neural rendering method which is able to synthesize high-quality appearance with motion-dependent texture, e.g., wrinkle and shade that are dependent on motion, driven by human motion. Notably, the looping 3D animation system provides the automated creation of visually appealing looping 3D animations in a flexible, accurate, and efficient manner.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
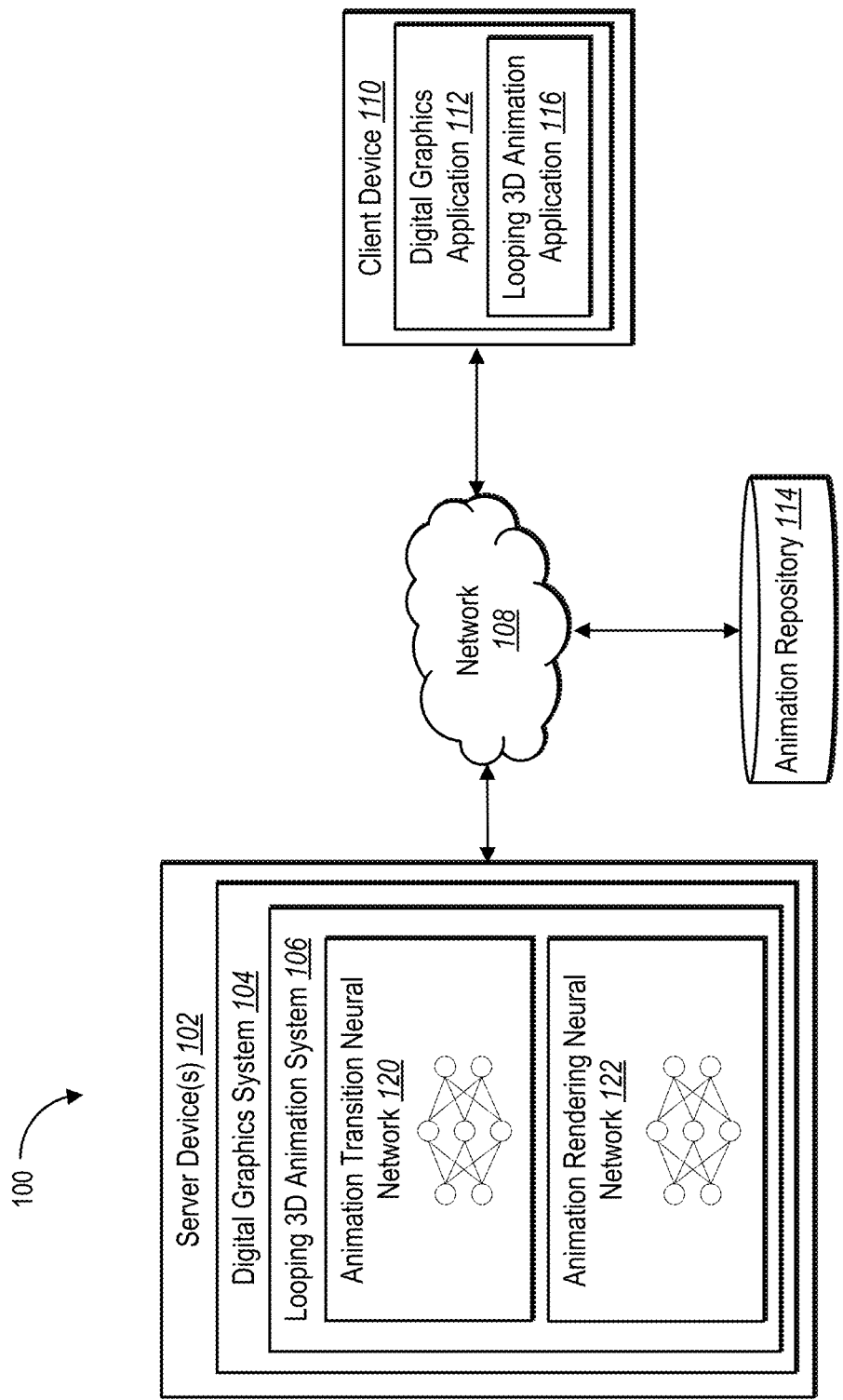
FIG. 1 illustrates an example system environment in which a looping 3D animation system operates in accordance with one or more embodiments.

The looping 3D animation system generates a looping 3D animation specific to a human and the human's pose in a digital image. In particular, the looping 3D animation system determines a starting pose from a still image of a human and estimates, or fits, a 3D model to the starting pose. The looping 3D animation system selects a target 3D animation sequence representing a target motion type. For example, the target motion type can be a pre-recorded 3D motion or motion captured from a video of a human in motion. The looping 3D animation system utilizes an animation transition neural network to generate a first animation sequence that comprises physically plausible 3D motion between the initial 3D model pose and the start of the target 3D animation sequence. Additionally, the looping 3D animation system utilizes the animation transition neural network to generate a second animation sequence that comprises physically plausible 3D motion between the end of the target 3D animation sequence the initial 3D model pose. The looping 3D animation system combines the first animation sequence, target 3D animation sequence, and second animation sequence into a looping 3D animation. The looping 3D animation system then generates a looping 3D animation by rendering a texture map specific to the person in the digital image to the looping 3D animation.

Indeed, the looping 3D animation system is able to generate a 3D looping animation from a single two-dimensional still image using deep learning. Furthermore, the looping 3D animation system generates such 3D looping animations with minimal user input. For example, the user need only indicate a starting digital image and a desired animation sequence. Using these inputs, the looping 3D animation system uses neural networks to automatically (e.g., without further user input) generate a 3D looping animation that starts from the pose from the two-dimensional still image, performs the desired animation sequence, and returns to the pose from the two-dimensional still image. Furthermore, the 3D looping animation utilizes deep learning based rendering such that the 3D looping animation appears to be performed by the person from the two-dimensional still image.

As discussed above, conventional systems have a number of technical shortcomings with regard to flexibility, accuracy, and efficiency in generating animations from digital images. One shortcoming conventional systems often have is rendering a looping 3D animation of human movement from different poses and views with physical plausibility. For example, conventional systems generate 3D animations by applying 2D rigging on a picture and interpolating 2D joints, but the animation results are often not physically plausible in 3D. Existing 3D approaches such as pose-guided person image generation fail to generate a physically plausible secondary motion, instead generating the same appearance for fast and slow motions. Indeed, existing systems fail to adequately account for how the 3D appearance of dressed humans undergoes a complex geometric transformation due to movement that is a function not only by the initial static pose, but also of the dynamics of the induced movement. Partly due to this complexity, such appearance modeling conditioned on motion has been largely neglected in existing human rendering methods, resulting in the rendering of physically implausible motion.

Yet another shortcoming of conventional systems is learning the dynamics of an animated appearance efficiently. Indeed, conventional systems use a prohibitively large amount of observational data when attempting to generate animated sequences. Because secondary motion is the result of complex physical interactions with the body, which is generally time-varying, it presents a major challenge for plausible rendering of dynamic dressed humans in animations. Conventional systems learn the dynamics of the secondary motion from videos. This, however, requires a tremendous amount of data (e.g., videos depicting all possible poses and associated motions). In practice, often only a short video clip is available (e.g., the maximum length of videos in social media such as TikTok are limited to 15-60 seconds). Furthermore, many conventional systems are computationally expensive to train and implement. For example, obtaining real data for training large-scale models on thousands (or even more) of digital images requires significant computer resources (in processing power and memory). Conventional systems have not identified an approach to address generating looping animations originating from the pose of a person in a still image, in part, because any solution would make the computational burden of implementing models prohibitively expensive.

As suggested above, embodiments of the looping 3D animation system can provide a variety of advantages over conventional image modification systems. The embodiments of the looping 3D animation system can improve flexibly, accuracy, efficiency, and computational cost by using neural rendering methods as described herein. For example, to provide a flexible animation, the looping 3D animation system combines an animation transition neural network and an animation rendering neural network to provide a diverse looping animation of human movement. In short, the looping 3D animation system creates a 3D animation from a still image using a neural transition method with data-driven motion priors for non-linear human motion interpolation between a static pose and query motion to create human body movements in a loop. Additionally, the looping 3D animation system models movement using a neural rendering method to efficiently synthesize a high-quality appearance with motion-dependent texture. In short, by integrating an animation transition neural network and an animation rendering neural network, the looping 3D animation system creates flexible options for creating diverse looping animations of human movement from poses in still images.

Indeed, the looping 3D animation system creates physically plausible looping 3D animation. Unlike conventional systems that generate implausible 3D animation by applying 2D rigging on a picture and simply interpolating 2D joints. The looping 3D animation system utilizes a 3D body model to represent complex body movements, which allows the looping 3D animation system to create plausible diverse human animation. Indeed, unlike 2D warping, the looping 3D animation system synthesizes secondary motion that is dependent on human motion, such as movements of clothing with realistic wrinkles and shading. Indeed, the looping 3D animation system uses a neural rendering method which synthesizes a high-quality appearance with motion-dependent texture (e.g., wrinkles and shading that are dependent on motion).

The looping 3D animation system efficiently generates the physically plausible motion by utilizing a compact motion representation. In particular, the looping 3D animation system enforces an equivariance model by utilizing a representation that transforms secondary motion in the way that the pose of the human is transformed. The looping 3D animation system models an equivariant encoder that generates a generalizable representation form the spatial and temporal derivatives of the 3D body surface. This learned representation is decoded by a compositional multi-task decoder that efficiently renders high fidelity time-varying appearance. Indeed, the looping 3D animation system uses an equivariance method to model the dynamics of the secondary motion as a function of spatial and time derivative of the 3D body which generates temporally coherent videos of an unseen secondary motion from novel views given a single view training video. In this manner, the looping 3D animation system conserves significant computer resources in processing power and memory when handling complex motion sequences.

Additional detail regarding the looping 3D animation system will now be provided with reference to the figures. For example, FIG. 1 illustrates a schematic diagram of an example system environment 100 (or "environment") for implementing a looping 3D animation system 106 in accordance with one or more embodiments. An overview of the looping 3D animation system 106 is described in relation to FIG. 1. Thereafter, a more detailed description of the components and processes of the looping 3D animation system 106 is provided in relation to the subsequent figures.

As shown, the environment 100 includes server device(s) 102, an animation repository 114, a client device 110, and a network 108. Each of the components of the environment communicate via the network 108, and the network 108 is any suitable network over which computing devices communicate. Example networks are discussed in more detail below in relation to FIG. 8.

As mentioned, the environment 100 includes a client device 110. The client device 110 is one of a variety of computing devices, including a smartphone, a tablet, a smart television, a desktop computer, a laptop computer, a virtual reality device, an augmented reality device, or another computing device as described in relation to FIG. 8. Although FIG. 1 illustrates a single instance of the client device 110, in some embodiments, the environment 100 includes multiple different client devices, each associated with a different user. The client device 110 communicates with the server device(s) 102 via the network 108. For example, the client device 110 provides information to server device(s) 102 indicating client device interactions (e.g., digital image selections, user interactions with one or more pixels of a digital image, or other input) and receives information from the server device(s) 102 such as digital images and/or animation information. Thus, in some cases, the looping 3D animation system 106 is implemented via the server device(s) 102 provides and receives information based on user interaction/input via the client device 110.

As shown in FIG. 1, the client device 110 includes a digital graphics application 112. In particular, the digital graphics application 112 is a web application, a native application installed on the client device 110 (e.g., a mobile application, a desktop application, etc.), or a cloud-based application where all or part of the functionality is performed by the server device(s) 102. Based on instructions from the digital graphics application 112, the client device 110 presents or displays information to a user, including digital images and/or animation information.

As illustrated in FIG. 1, the environment 100 includes the server device(s) 102. The server device(s) 102 generates, tracks, stores, processes, receives, and transmits electronic data, such as digital images, 3D looping animations, and/or outputs of neural networks. For example, the server device(s) 102 receives data from the client device 110 in the form of an indication of a client device interaction with a digital image. In response, the server device(s) 102 transmits data to the client device 110 to cause the client device 110 to display a 3D looping animation generated from the digital image.

In some embodiments, the server device(s) 102 communicates with the client device 110 to transmit and/or receive data via the network 108. In some embodiments, the server device(s) 102 comprises a distributed server where the server device(s) 102 includes a number of server devices distributed across the network 108 and located in different physical locations. The server device(s) 102 comprises a content server, an application server, a communication server, a web-hosting server, a multidimensional server, or a machine learning server. The server device(s) 102 further accesses and utilizes the animation repository 114 to store and retrieve animations from which to based 3D looping animations.

As further shown in FIG. 1, the server device(s) 102 also includes the looping 3D animation system 106 as part of a digital graphics system 104. For example, in one or more implementations, the digital graphics system 104 allows a user to store, generate, modify, edit, enhance, provide, distribute, and/or share digital content, such as digital images. For example, the digital graphics system 104 provides tools for the client device 110, via the digital graphics application 112, to display or manipulate digital images. In some implementations, the digital graphics system 104 provides tools for generating animations or otherwise modifying digital images.

In one or more embodiments, the server device(s) 102 includes all, or a portion of, the looping 3D animation system 106. For example, the looping 3D animation system 106 operates on the server device(s) 102 to generate 3D looping animations and provide 3D looping animations to the client device 110. As illustrated, the looping 3D animation system 106 utilize an animation transition neural network 120 and an animation rendering neural network 122 to generate the looping 3D animations.

In certain cases, the client device 110 includes all or part of the looping 3D animation system 106. Indeed, as illustrated, the client device 110 can include a looping 3D animation application 116 with the same or similar functionality to the looping 3D animation system 106. For example, the client device 110 obtains (e.g., download) or utilizes one or more aspects of the looping 3D animation system 106, such as the animation transition neural network 120 and the animation rendering neural network 122 from the server device(s) 102. Indeed, in some implementations, the looping 3D animation system 106 is located, in whole or in part, on the client device 110. For example, the looping 3D animation application 116 includes a web hosting application that allows the client device 110 to interact with the server device(s) 102. To illustrate, in one or more implementations, the client device 110 accesses a web page supported and/or hosted by the server device(s) 102.

For example, in some embodiments, the looping 3D animation system 106 trains the animation transition neural network 120 and the animation rendering neural network 122 via the server device(s) 102. The server device(s) 102 then provides the animation transition neural network 120 and the animation rendering neural network 122 to the client device 110 to generate a looping 3D animation based on the starting pose from a digital image. In other embodiments, the server device(s) 102 both train and implement the animation transition neural network 120 and the animation rendering neural network 122. For example, the server device(s) 102 receive a digital image from the client device 110 and generate a looping 3D animation from the digital image, which the server device(s) 102 provide to the client device 110.

Although FIG. 1 illustrates a particular arrangement of the environment, in some embodiments, the environment has a different arrangement of components and/or may have a different number or set of components altogether. For instance, as mentioned, the looping 3D animation system 106 is implemented by (e.g., located entirely or in part on) the client device 110. In addition, in one or more embodiments, the client device 110 communicates directly with the looping 3D animation system 106, bypassing the network 108.

Figure 2:
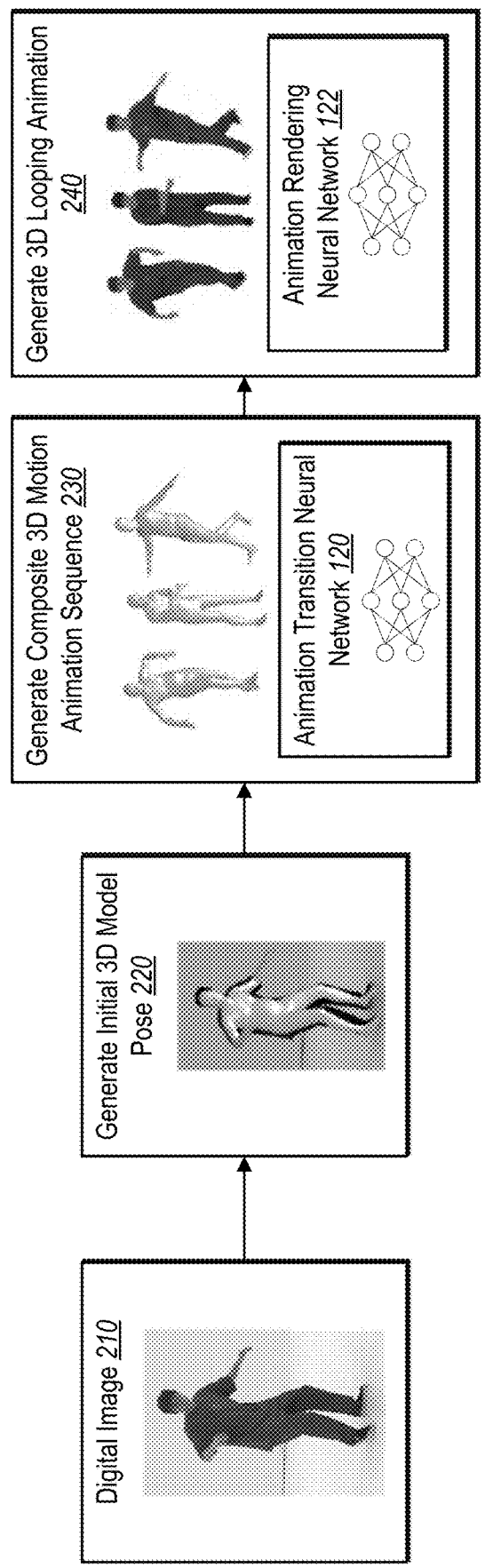
FIG. 2 illustrates an overview of generating a looping 3D animation from an image in accordance with one or more embodiments.

As mentioned, in one or more embodiments, the looping 3D animation system 106 works with an image to generate plausible looping 3D animation from the starting pose of a person in a digital image. FIG. 2 illustrates an overview of generating a looping 3D animation utilizing the looping 3D animation system 106 in accordance with one or more embodiments.

For example, FIG. 2 illustrates the looping 3D animation system 106 receives or identifies a digital image 210. Specifically, the digital image 210 is a single digital image comprising a person in a pose. In particular, the pose refers to the arrangement and posture of the person in the image. The pose is based on factors such as the angle of the head, the placement of the limbs, the orientation of the body, and/or the overall body positioning of the person in the digital image. In one or more embodiments, a digital image includes a video frame in a digital video. Accordingly, a digital animation includes a plurality of digital images. The looping 3D animation system 106 performs fits a 3D model to the pose to the digital image 210 to generate an initial 3D model pose 220. A 3D model refers generally to a representation of an object (inanimate or living) in three-dimensional space. 3D models represent a 3D object using a collection of points in 3D space, connected by various geometric entities such as triangles, lines, curved surfaces, vertices, polygons, etc. This collection of points, in some cases, forms a three-dimensional mesh. A 3D mesh generally refers to a set of polygons defining the surface of a three-dimensional object or character. Similarly, a two-dimensional mesh (or "2D mesh") generally refers to 2D representation of a set of polygons defining the surface of an object or character. In some cases, the 2D mesh may correspond to a UV mesh within a UV map. Further, when the UV mesh only forms a portion of an object or character, the UV mesh may be called a shell, particularly in 2D or UV space. For example, a shell for the head, torso, arms, and legs form a UV mesh of a body for a character. Likewise, separate 3D parts (e.g., body part) of the 3D mesh may be called a portion (e.g., an arm portion, torso portion or leg portion).

In one or more implementations, the looping 3D animation system 106 uses machine learning algorithms to analyze the image and detect keypoints on the body of the person depicted in the image and uses this information to estimate the overall pose of the person in the image. These keypoints include joints, such as the elbows, knees, and shoulders, as well as other points of interest, such as the head, eyes, hands, etc. The looping 3D animation system 106 analyzes the relationships between the keypoints, such as the angles between the joints, to estimate the pose. Furthermore, the looping 3D animation system 106 aligns a 3D model with the pose of the person in the image to generate an initial 3D model pose 220 or a 3D model in an initial pose. In particular, the looping 3D animation system 106 establishes a correspondence between the keypoints on the image and the keypoints on the 3D model (e.g., matches the keypoints on the image with their corresponding points on the 3D model). Then the looping 3D animation system 106 manipulates the 3D model to align the keypoints of the 3D model to the positions indicated by the corresponding keypoints of the person in the digital image. In particular, the looping 3D animation system 106 manipulates the 3D model into the pose of the person in the image by adjusting the position, rotation, and scale of the components of the 3D model so that it matches the pose of the person in the image.

Alternatively, rather manipulating a pre-existing (e.g., a template 3D model) into the pose of the person in the digital image 210, the looping 3D animation system 106 generates a 3D model in the pose of the person in the digital image 220. For example, in one or more implementations, the looping 3D animation system 106 utilizes a course-to-fine 3D generative framework, such as that described by Wang et al. in Complete 3D Human Reconstruction from a Single Incomplete Image, CVPR 2023, available at https://openaccess.thecvf.com/content/CVPR2023/papers/Wang_Complete_3D_Human_Reconst ruction_From_a_Single_Incomplete_Image_CVPR_2023_paper.pdf, the entire contents of which are hereby incorporated by reference in their entirety.

The looping 3D animation system 106 utilizes an animation transition neural network 120 to create a composite 3D motion animation sequence 230. A composite 3D motion animation sequence 230 comprises an animation of a 3D model that starts from an initial 3D model pose 220, transitions to a desired animation, performs the desired animation, and transitions back to the initial 3D model pose 220. Specifically, a user selects an animation sequence. For example, a user selects an animation sequence from animation repository 114. The selected animation sequence comprises a 3D model performing a sequence of moves (e.g., walking, running, dancing, swimming, flying, combat).

In alternative implementations, the user selects a video of a person performing a sequence of moves. For example, the user selects a video posted to social media or other video of a person performing a dance or other sequence of moves. The looping 3D animation system 106 then generates an animation sequence from the video by aligning a 3D model to the person in the various poses in frames of the video.

Figure 3:
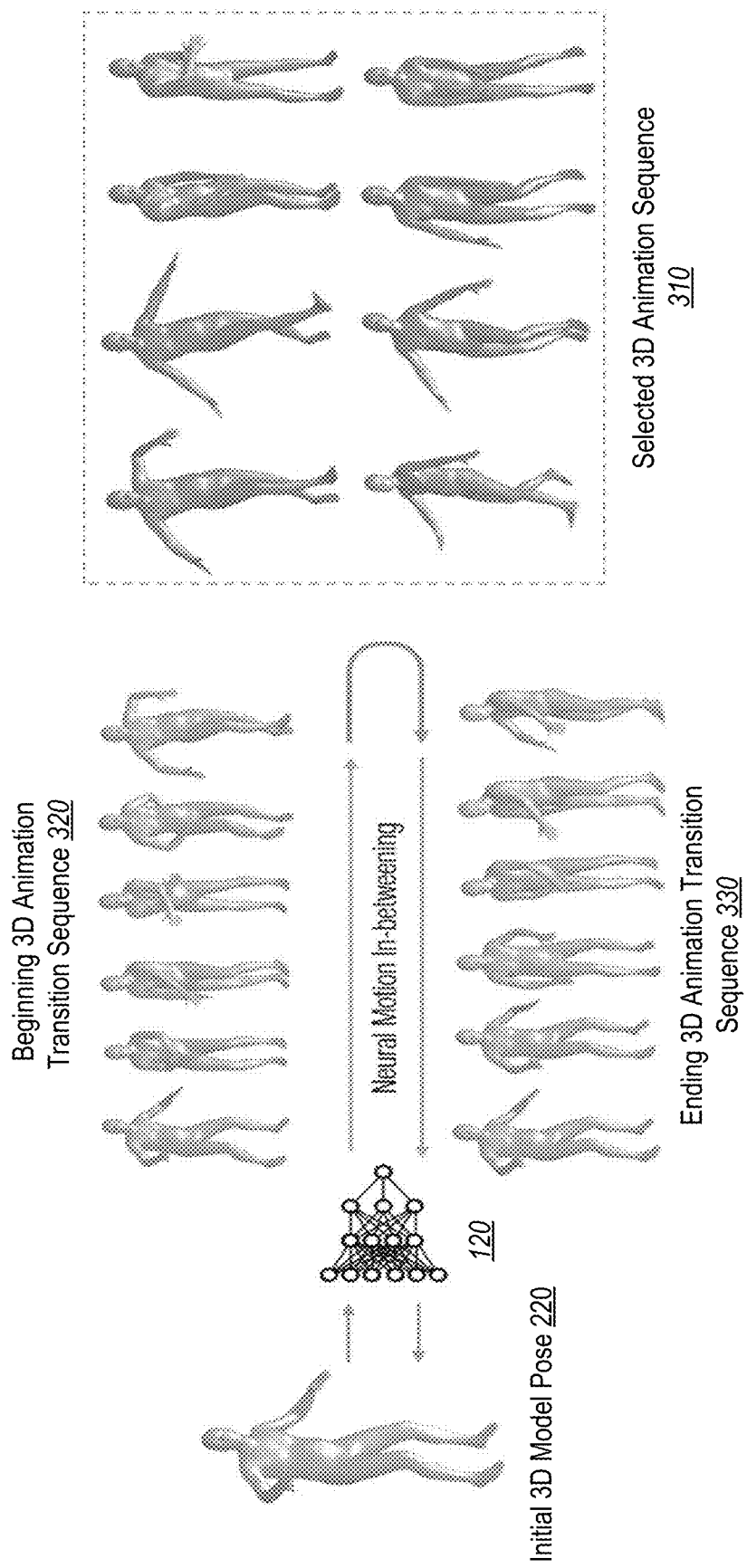
FIG. 3 illustrates an example utilizing an animation transition neural network to generate a composite 3D looping animation in accordance with one or more embodiments.

In any event, upon identifying a selected animation, the looping 3D animation system 106 utilizes the animation transition neural network 120 to generate a first 3D animation transition sequence. The first 3D animation transition sequence comprises an animation sequence of a 3D model that transitions from the initial 3D model pose 220 to the initial pose of the selected animation sequence. Similarly, the looping 3D animation system 106 utilizes the animation transition neural network 120 to generate a second 3D animation transition sequence. The second 3D animation transition sequence comprises an animation sequence of a 3D model that transitions from the final pose of the selected animation sequence the initial 3D model pose 220. FIG. 3 and the associated description provides greater detail on generating the first and second 3D animation transition sequences. The looping 3D animation system 106 combines (e.g., concatenates) the first 3D animation transition sequence, the selected animation sequence, and the 3D animation transition sequence to generate the composite 3D motion animation sequence 230.

Figure 4:
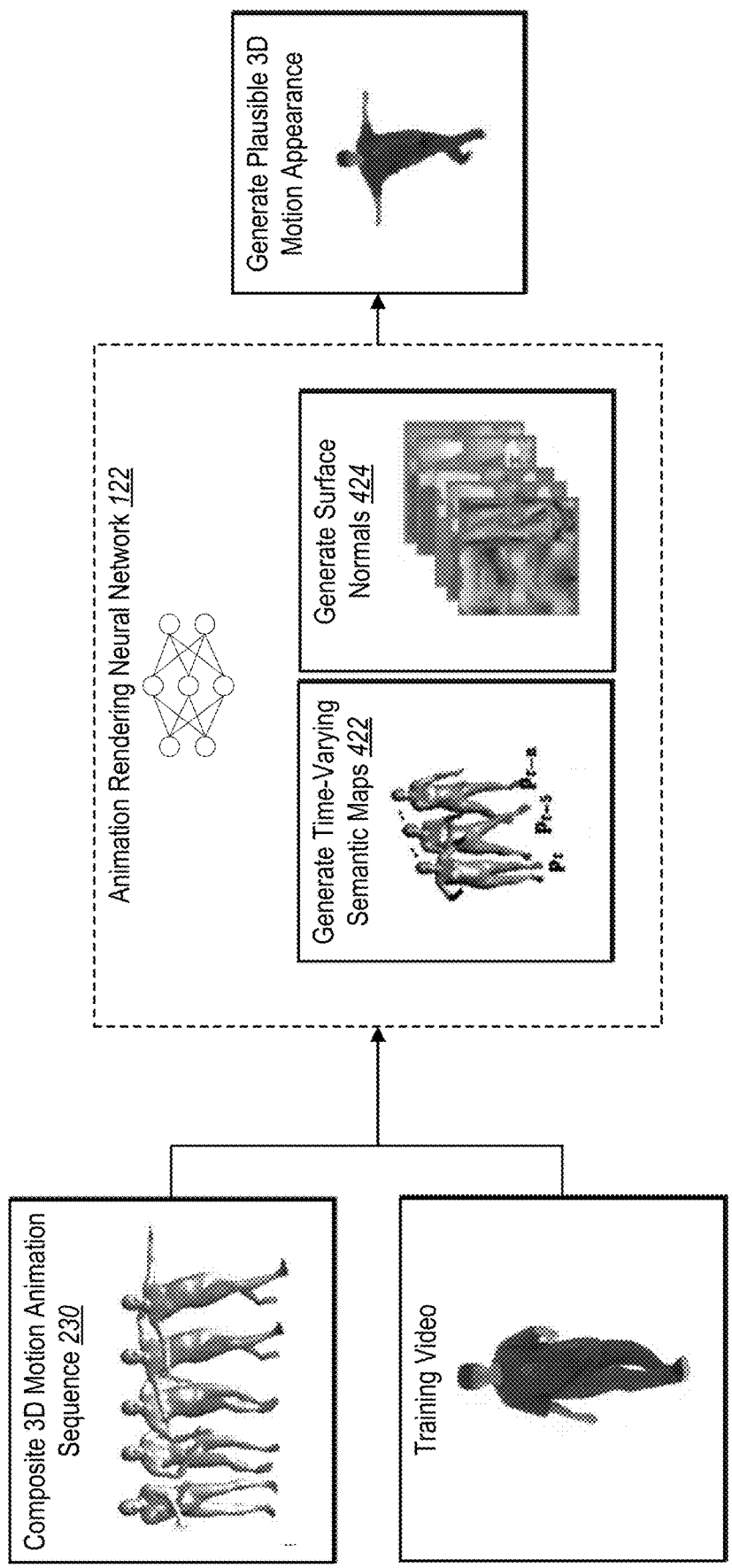
FIG. 4 illustrates an example utilizing an animation rendering neural network to provide an animation with a plausible 3D motion appearance in accordance with one or more embodiments.

The looping 3D animation system 106 utilizes the animation rendering neural network 122 to generate a 3D looping animation 240. In particular, the looping 3D animation system 106 modifies the composite 3D motion animation sequence 230 utilizing the animation rendering neural network 122. Specifically, the looping 3D animation system 106 applies a texture map to each of the 3D animation sequence, the first 3D animation transition sequence, and the second 3D animation transition sequence utilizing the animation rendering neural network 122. FIG. 4 and the associated description provides greater detail on generating the 3D looping animation 240.

As mentioned, in one or more embodiments, the looping 3D animation system 106 generates 3D animation transition sequences to, and from, the 3D model pose of act 220 and the selected 3D animation sequence 310. FIG. 3 illustrates an overview of creating 3D animation transition sequences using the animation transition neural network 120. For example, FIG. 3 illustrates the animation transition neural network 120 receives a selected 3D animation sequence 310 and an initial 3D model pose 220. The looping 3D animation system 106 utilizes the animation transition neural network 120 to generate a beginning 3D animation transition sequence 320 between the initial 3D model pose 220 and the selected 3D animation sequence 310.

Similarly, the looping 3D animation system 106 utilizes the animation transition neural network 120 to generate an ending 3D animation transition sequence 330 between the selected 3D animation sequence 310 and the initial 3D model pose 220. The looping 3D animation system 106 combines the beginning 3D animation transition sequence 320, selected 3D animation sequence 310, and the ending 3D animation transition sequence 330 to generate the composite looping 3D animation sequence 230.

The starting pose of the selected target 3D animation sequence typically will not match the pose of the person in the digital image 210 (and the initial 3D model pose 220 generated therefrom). Accordingly, the looping 3D animation system 106 performs a neural in-betweening method with data-driven motion priors for non-linear human motion interpolation between the static initial 3D model pose 220 and the motion from the selected 3D animation sequence, which allows modeling realistic human body movements in a loop.

In particular, in one or more embodiments, the animation transition neural network 120 generates a beginning 3D animation transition sequence that comprises a sequence of images to transition from the initial 3D model pose 220 to the first pose in the selected 3D animation sequence 310. As shown, the beginning 3D animation transition sequence 320 comprises a plurality of sequential poses of a 3D model that transition from the pose of the person in the digital image (e.g., the initial 3D model pose 220) to the starting pose of the selected 3D animation sequence 310.

As mentioned, the animation transition neural network 120 is able to generate a 3D animation transition sequence comprising any number of different motion types. For example, when creating walking animation, the animation transition neural network 120 subdivides the movement down into several stages, such as the contact phase, the propulsion phase, and the recovery phase. Running is a more dynamic and fast-paced form of movement compared to walking, and the animation transition neural network 120 creates movements that model running with a sense of urgency or excitement. For example, the animation transition neural network 120 models running as a series of quick steps, where one foot is on the ground and the other foot is lifted and swung forward. The animation transition neural network 120 models dancing as a form of movement with a wide range of types, such as hip-hop, jazz, and ballet. For example, the animation transition neural network 120 models dancing as a combination of different movements, such as turns, leaps, and poses, and creates a sense of rhythm and music. The animation transition neural network 120 models swimming and flying as complex movements that involve the whole body and create a sense of freedom and fluidity. The animation transition neural network 120 models combat as a form of movement that creates a sense of action and tension. For example, the animation transition neural network 120 models combat as a combination of different movements, such as punches, kicks, and blocks, to create a sense of power and danger.

Specifically, in one or more embodiments, the animation transition neural network 120 combines a neural in-betweening method with data-driven motion priors for non-linear human motion interpolation between the initial 3D model pose 220 and the selected 3D animation sequence. Given that a motion sequence consists of different poses at different time steps, the animation transition neural network 120 represents a motion sequence as a continuous function f: t→f(t), which parameterizes the entire sequence by the temporal coordinate t. To extend the looping 3D animation system 106 to general motion synthesis, the animation transition neural network 120 utilizes a random vector z as the conditioning variable to the function as f (t; z), which encodes the mapping from the normal distribution to the manifold spanned by all plausible motions. By varying z, the animation transition neural network 120 generates an output motion with different types, and by varying t, the looping 3D animation system 106 obtains the pose at arbitrary time. In one or more embodiments, the animation transition neural network 120 comprises a generative neural network. For example, the animation transition neural network 120 comprises a Variational Autoencoder (VAE), where motion sequences are fed to convolutional encoders first to obtain the sampling of z, and then z is passed through an MLP decoder for the reconstruction of the whole motion. The animation transition neural network 120 formulates the tasks as optimization problems to find the latent variable z that minimize the target energies and restore the complete plausible motion sequences.

Indeed, in one or more embodiments, the animation transition neural network 120 searches the latent space to approximate the underlying motion based on a continuous representation. Thus, the animation transition neural network 120 defines the energy function as the reconstruction loss on given frames, which measures the differences on joint rotations, root orientations, joint positions, and root translations as:

$$z_l^*, z_g^* := \arg\min_{z_l, z_g} \sum_T \lambda rot\ Lrot + \lambda ori\ Lori + \lambda pos\ Lpos + \lambda trans\ Ltrans$$

where $L_{trans}$ weighted by $\lambda_{trans}$ evaluates the evaluates the Li loss on root joint positions $r_t$ predicted from a standalone global motion predictor. To facilitate convergence, the animation transition neural network 120 first performs interpolation in the joint angle space, and then the interpolated inputs are passed through encoders to obtain the initialization of $z_l$ and $z_g$.

Similarly, the ending pose of the selected target 3D animation sequence may not correspond to the starting pose from the input image (e.g., the initial 3D model pose 220). In one or more embodiments, the looping 3D animation system 106 generates an ending 3D animation transition sequence 330 that comprises a sequence of images to transition from the last pose in the selected 3D animation sequence 310 to the initial 3D model pose 220. Indeed, the looping 3D animation system 106 utilizes the animation transition neural network 120 to generate the ending 3D animation transition sequence 330 in a similar manner to that described above for generating the beginning 3D animation transition sequence 320. As shown, the ending 3D animation transition sequence 330 comprises a plurality of sequential poses of a 3D model that transition from the ending pose of the selected 3D animation sequence 310 to the pose of the person in the digital image (e.g., the initial 3D model pose 220).

The looping 3D animation system 106 generates the composite 3D motion animation sequence 230. In particular, the looping 3D animation system 106 generates the composite 3D motion animation sequence 230 by combining the beginning 3D animation transition sequence 320, the selected 3D animation sequence 310, and the ending 3D animation transition sequence 330. The composite 3D animation sequence 230 is a looping 3D animation that seamlessly transitions from the initial 3D model pose 220 to the selected animation sequence 310 and back to the initial 3D model pose 220 via the beginning 3D animation transition sequence 320 and the ending 3D animation transition sequence 330.

As mentioned above, the looping 3D animation system 106, generates a plausible 3D motion appearance that accounts for complex motion induced by the movement of a person. FIG. 4 illustrates an overview of how the animation rendering neural network 122 performs neural rendering to generate a plausible 3D motion appearance in accordance with one or more embodiments.

In particular, the animation rendering neural network 122 learns (via training videos) to generate a physically plausible human appearance by rending a texture map specific to the person in the digital image to the composite 3D motion animation sequence 230. Indeed, the animation rendering neural network 122 provides a representation to describe the time-varying appearance of the secondary motion induced by body movement. The time-varying appearance refers to the way that an object changes over time in terms of its visual properties, such as color, texture, shape, and lighting. The animation rendering neural network 122 renders the appearance of an object changes as it moves through different actions and poses. The animation rendering neural network 122 utilizes a multi-task compositional rendering that uses this representation to render the subject-specific final appearance of moving dressed humans.

Specifically, by using an equivariant encoder, the animation rendering neural network 122 creates a generalizable representation from the spatial and temporal derivatives of the 3D body surface. Indeed, the rendering utilizes two intermediate representations including time-varying semantic maps that capture the garment specific silhouette deformations and surface normal that capture the local geometric changes such as folds and wrinkles. These intermediate representations are combined to synthesize the final appearance. In one or more embodiments, the animation rendering neural network 122 utilizes a 3D animation rendering similar to that described by Jae Shin Yoon, Duygu Ceylan, Tuanfeng Y. Wang, Jingwan Lu, Jimei Yang, Zhixin Shu, and Hyun Soo Park in *Learning Motion-Dependent Appearance for High-Fidelity Rendering of Dynamic Humans from a Single Camera*, 2022, incorporated by reference herein in its entirety.

Indeed, the looping 3D animation system 106 synthesizes texture maps providing an appearance of the person form the digital image. The looping 3D animation system 106 then renders the texture maps on the combined 3D animation sequence. More specifically, the looping 3D animation system 106 synthesizes motion-dependent texture that models wrinkles and shade in a motion dependent manner. Thus, the looping 3D animation system 106 performs neural rendering that is able to synthesize high-quality appearance with motion-dependent texture driven by human motion.

Given the composite 3D motion animation sequence 230 and input digital image 210, the looping 3D animation system 106 utilizes the animation rendering neural network 122 to generate generalizable representations of the 3D body animation and render a high-fidelity time-varying appearance. Indeed, the looping 3D animation system 106 learns a meaningful representation by enforcing an equivariant property—by utilizing a representation that is expected to be transformed in the way that the body pose is transformed. Using the equivariance model, the animation rendering neural network 122 models the dynamics of the secondary motion as a function of spatial and time derivative of the 3D body. The animation rendering neural network 122 constructs this representation by re-arranging 3D features in the canonical coordinate system of the body surface (e.g., the UV map).

The animation rendering neural network 122 accounts for two dominant factors that significantly impact the physicality of the generated appearance. First, the silhouette of dressed humans is transformed according to the body movement and the physical properties (e.g., material) of the individual garment types (e.g., top and bottom garments might undergo different deformations). Second, the local geometry of the body and clothes is highly correlated (e.g., surface normals of T-shirt and body surface) which causes appearance and disappearance of folds and wrinkles. To incorporate these factors, the animation rendering neural network 122 utilizes a compositional decoder that breaks down the final appearance rendering into modular subtasks. The decoder predicts the time-varying semantic maps 422 and surface normals 424 as intermediate representations. While the semantic maps capture the time-varying silhouette deformations, the surface normals 424 are effective in synthesizing high-quality textures, which further enables relighting. The animation rendering neural network 122 combines these intermediate representations to produce the final appearance. Indeed, the animation rendering neural network 122 generates a temporally coherent video of an unseen secondary motion from a novel pose given in a single view digital image 210.

As mentioned, in one or more embodiments, the animation rendering neural network 122 generates intermediate representations comprising time-varying semantic maps that capture garment specific silhouette deformations. The animation rendering neural network 122 performs human rendering by learning a representation via a feature encoder-decoder framework:

$$f = E(p), A = D(f),$$

where an encoder E takes as an input a representation of a posed body, p (e.g., 2D sparse or dense keypoints or 3D body surface vertices), and outputs per-pixel features f that can be used by the decoder D to reconstruct the appearance $A \in [0, 1]^{w \times h \times 3}$ of the corresponding pose where w and h are the width and height of the output image (appearance). E is modeled to render static appearance, and a 3D motion descriptor is used to render time-varying appearance with secondary motion effects.

Learning a representation from a limited amount of data is challenging because both encoder and decoder need to memorize every appearance in relation to the corresponding pose, A↔p. To address the data challenge, in one or more embodiments, the animation rendering neural network 122 utilizes an equivariant geometric transformation, W, such that a feature is expected to be transformed in the way that the body pose is transformed:

$$E(Wx) = WE(x),$$

where x is an arbitrary pose. A naive encoder that satisfies this equivariance learns a constant feature $f_0$ by warping any p to a neutral pose $p_0$:

$$f_0 = E(W^{-1}p) = const., A = D(Wf_0),$$

where $p = W p_0$. f can be derived by warping p to the T-pose, $W^{-1}p$ of which feature can be warped back to the posed feature before decoding, D (WE($W^{-1}$p)). Since $f_0$ is constant, the encoder E does not need to be learned. In one or more implementations, the animation rendering neural network 122 learns the decoder D to render a static appearance.

To model the time-varying appearance for the secondary motion that depends on both body pose and motion, in one or more embodiments, the animation rendering neural network 122 encodes the spatial and temporal gradients as a residual feature using the spatial and temporal derivatives of the posed body. The spatial derivatives represent the pose corrective deformations. The temporal derivatives denote the body surface velocity which results in secondary motion. Since these spatial and temporal gradients are no longer constant, animation rendering neural network 122 learns an encoder $E_\Delta$ to encode the residual features.

In one or more embodiments, the animation rendering neural network 122 utilizes a 3D representation of the posed body from an image by using spatial and temporal derivatives of the body pose corresponding to the surface normals and body surface velocities, respectively:

$$f_{3D} = E_\Delta(W^{-1}N, W^{-1}V), A = D(\Pi W f_{3D}),$$

where $$N = \frac{\partial p}{\partial x} \in R^{m \times 3}$$

is the 3D surface normal, and $$V = \frac{\partial p}{\partial t} \in R^{m \times 3}$$

represents the instantaneous velocities of the m vertices in the body surface. The animation rendering neural network 122 models the geometric transformation function W to warp an arbitrary 3D pose p to a canonical representation, $p_0$. The animation rendering neural network 122 records $f_{3D}$ in a spatially aligned 2D positional map, specifically the UV map of the 3D body mesh where each pixel contains the 3D information of a unique point on the body mesh surface. The animation rendering neural network 122 leverages 2D CNNs to apply local convolution operations to capture the relationship between neighboring body parts. Indeed, $f_{3D} \in R^{m \times d}$ is the feature defined in the UV coordinates where d is the dimension of the per-vertex 3D feature.

As mentioned, the animation rendering neural network 122 generates surface normals 424 that capture the local geometric changes such as folds and wrinkles. Indeed, in one or more embodiments, the animation rendering neural network 122 utilizes a decoder using a composition of modular functions where each modular function is learned to generate physically and semantically meaningful intermediate representations. The animation rendering neural network 122 uses multi-task learning to provide each intermediate representation receives its own supervision signals. The animation rendering neural network 122 shares the motion features by all intermediate modules resulting in a compact representation. The animation rendering neural network 122 models each module as an autoregressive network to allow learning the dynamics rather than memorizing the pose-specific appearance.

Indeed, in one or more embodiments, the animation rendering neural network 122 utilizes a decoder is a composition of two modular functions:

$$D = D_a \circ D_s$$

where $D_s$ and $D_a$ are the functions that generate the shape with semantic maps and the appearance. $D_s$ learns the dynamics of the 2D shape:

$$\hat{s}_t = D_s(\hat{s}_{t-1}; \hat{f}_t)$$

where $\hat{f}_t = \Pi W_t \hat{f}_t$ is the projected features onto the image at time t, and $\hat{s}_t, d \in \{0, \ldots, L\}^{w \times h}$ is the predicted shape with semantics where L is the number of semantic categories.

In one or more embodiments, the animation rendering neural network 122 sets L=7 (e.g., background, top clothing, bottom clothing, face, hair, skin, shoes). $D_a$ learns the dynamics of appearance given the shape and 3D motion descriptor:

$$\hat{A}_t, \hat{n}_t = D_a(\hat{A}_{t-1}, \hat{n}_{t-1}, \hat{s}_t, \hat{f}_t),$$

where $\hat{A}_t \in R^{w \times h \times 3}$ and $\hat{n}_t \in R^{w \times h \times 3}$ are the generated appearance and surface normals at time t.

In one or more embodiments, the animation rendering neural network 122 learns the 3D motion descriptor as well as the modular decoder functions by minimizing the following loss:

$$L = \sum_{P, A \in D} L_a + \lambda_s L_s + \lambda_n L_n + \lambda_p L_p + \lambda_g L_g,$$

where $L_a$, $L_s$, $L_n$, $L_p$, $L_g$ are the appearance, shape, surface normal, perceptual similarity, and generative adversarial losses, and $\lambda_s$, $\lambda_n$, $\lambda_p$, and $\lambda_g$ are their weights, respectively. In one or more embodiments, the animation rendering neural network 122 uses the values $\lambda_s=10$, $\lambda_n=\lambda_p=1$ and $\lambda_g=0.01$. D is the training dataset composed of the ground truth 3D pose P and its appearance A.

$$L_a(P, A) = \|\hat{A} - A\|,$$
$$L_s(P, A) = \|\hat{s} - S(A)\|,$$
$$L_s(P, A) = \|\hat{n} - N(A)\|,$$
$$L_s(P, A) = \sum_i \|VGG_i \hat{A} - VGG_i A\|,$$
$$L_g(P, A) = E_{S(A), A}[\log(D^*(S(A), A)] + E_{S(A), \hat{A}}[\log(D^*(S(A), \hat{A})]$$

where $\hat{A}$, $\hat{s}$, and $\hat{n}$ are the generated appearance, shape, and surface normal, respectively. S and N are the shape and surface normal estimates, and VGG is the feature extractor that computes perceptual features from conv-i-2 layers in VGG-16 networks, D* is a discriminator architecture (e.g., PatchGAN discriminator) that validates the plausibility of the synthesized image conditioned on the shape mask.

The looping 3D animation system 106 generates plausible 3D animation appearances by combining the intermediate representations of the time-varying semantic maps and the surface normals to synthesize the final 3D animation appearance. In other words, the looping 3D animation system 106 modifies, utilizing the animation rendering neural network 122, each of the selected 3D animation sequence 310, the beginning 3D animation transition sequence 320, and the ending 3D animation transition sequence 330 by applying a texture map (e.g., intermediate representations of the time-varying semantic maps and the surface normal). The looping 3D animation system 106 generates the looping 3D animation 240 by combining the modified 3D animation sequence, the modified beginning 3D animation transition sequence, and the modified ending 3D animation transition sequence.

FIGS. 5A-5E illustrate examples of one or more embodiments of the looping 3D animation interface 502 on a client device. As illustrated, the looping 3D animation system 106 includes text and/or graphics along with selectable elements for generating a 3D looping animation from a source image. In various implementations, the looping 3D animation system 106 provides a user interface to select the attributes for a source image, a motion type, a background image, the X and Y coordinates, an image scale, and/or an image viewpoint. Although shown as graphical elements in FIGS. 5A-5E, in alternative implementations the looping 3D animation system 106 provides (e.g., in connection with, or in place of, the graphical elements) textual or other selectable elements to choose the desired attributes for the looping 3D animation.

Figure 5A:
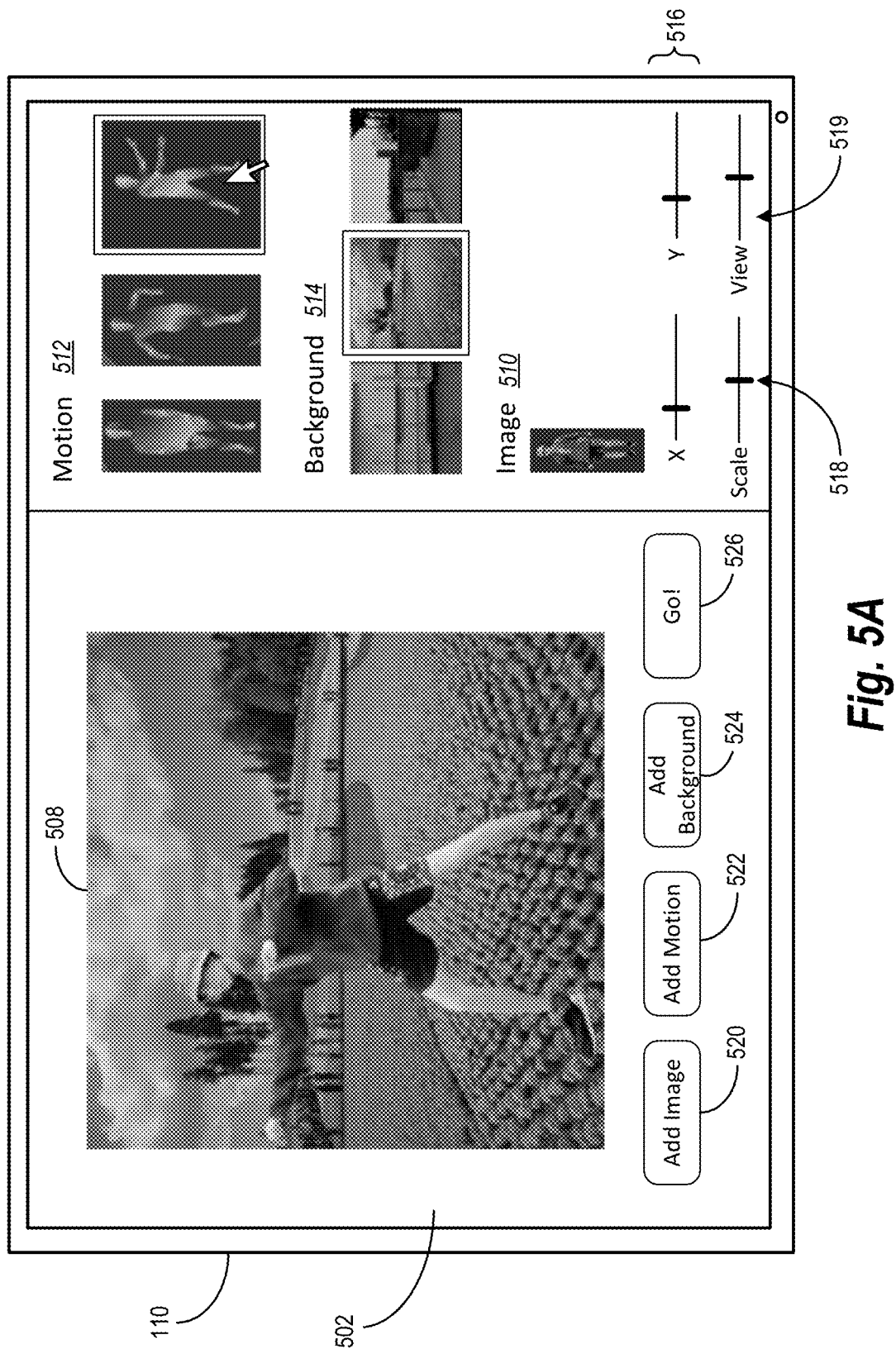
FIG. 5A-5E illustrate example frontend workflow of creating looping 3D animations utilizing a graphical user interface in accordance with one or more embodiments.

As FIG. 5A illustrates, the looping 3D animation interface 502 includes an animation preview display 508. The animation preview display 508 displays a preview of the animation that includes a rendition of a person based on the selected attributes for source image, motion type, background image, X and Y coordinates, image scale, and image viewpoint. In various implementations, the looping 3D animation system 106 causes the user device to change the selected attributes for the looping 3D animation, the display in the animation preview display 508 changes to reflect the attribute selections.

As FIG. 5A illustrates, the looping 3D animation interface 502 includes a select source image portion 510. As illustrated, the select source image portion 510 enables the selection of one or more digital images comprising a person positioned in a pose. As also shown in FIG. 5A, the looping 3D animation system 106 provides a selectable element 520 that enables an alternative method for the selection of one or more digital images comprising a person positioned in a pose. For example, the select source image portion 510 (or selectable element 520) enables the selection of one or more digital images (e.g., via a drop-down menu or another selection method). In some implementations, the looping 3D animation system 106 provides various search and filtering tools within the select source image portion 510 (or selectable element 520) for selecting digital images. In various implementations, as shown in FIGS. 5A-5E, the looping 3D animation system 106 adds an image of person pictured in the selected image to the animation preview display 508.

As also shown in FIG. 5A, the looping 3D animation interface 502 includes a select motion type portion 512. As illustrated, the select motion type portion 512 enables the selection of a motion type for the looping 3D animation system 106 to use to generate the looping 3D animation. As also shown in FIG. 5A, the looping 3D animation system 106 provides a selectable element 522 that enables an alternative method for the selection of one or more motion types. As shown, the looping 3D animation interface 502 allows a user to toggle between diverse motion type selections. Each motion type is associated with a 3D animation sequence. In one or more implementations, the looping 3D animation system 106 generates the looping 3D animation in response to user selection of a 3D animation sequence (e.g., a motion type) without further user input.

As shown in FIG. 5A, the looping 3D animation interface 502 includes a select background portion 514. As shown, the looping 3D animation interface 502 allows a user to toggle between diverse background selections. As also shown in FIG. 5A, the looping 3D animation system 106 provides a selectable element 524 that enables an alternative method for the selection of one or more digital backgrounds. For example, the select background portion 514 (or selectable element 524) enables the selection of one or more digital backgrounds (e.g., via a drop-down menu or another selection method). In some implementations, the looping 3D animation system 106 provides various search and filtering tools within the select background portion 514 (or selectable element 524) for selecting digital backgrounds. In various implementations, as shown in FIGS. 5A-5E, the looping 3D animation system 106 utilizes the selected background in the image of the person displayed in the animation preview display 508.

As shown in FIG. 5A, the looping 3D animation interface 502 includes a selectable elements 516. Specifically, the looping 3D animation interface 502 includes selectable elements to allow positioning of the image of the person at different positions within the selected background. As shown, the looping 3D animation interface 502 allows for selection of X and Y coordinates to position the image of the person within the background. Although not shown, the looping 3D animation interface 502 provides other methods of positioning the image of the person, such as clickable arrows or text entry fields. In various implementations, as shown in FIGS. 5A-5E, the looping 3D animation system 106 utilizes the selected positioning of the image of the person in the animation preview display 508.

As shown in FIG. 5A, the looping 3D animation interface 502 includes a selectable element 518. In particular, the looping 3D animation interface 502 includes a selectable element to allow altering of the size of the image of the person within the selected background. In various implementations, as shown in FIGS. 5A-5E, the looping 3D animation system 106 utilizes the selected size of the image of the person in the animation preview display 508.

As shown in FIG. 5A, the looping 3D animation interface 502 includes a selectable element 519. In particular, the looping 3D animation interface 502 includes a selectable element 519 to allow altering of the view of the image of the person within the selected background. In various implementations, as shown in FIGS. 5A-5E, the looping 3D animation system 106 utilizes the selected view of the image of the person in the animation preview display 508.

As shown in FIG. 5A, the looping 3D animation interface 502 includes a selectable element 526. In particular, the looping 3D animation interface 502 includes a selectable element that causes the user device to display a preview of the looping 3D animation based on the selected attributes. Indeed, upon receiving a selection of the selectable element 526, the looping 3D animation interface 502 displays a preview of the looping 3D animation based on the selected attributes.

Figure 5B:
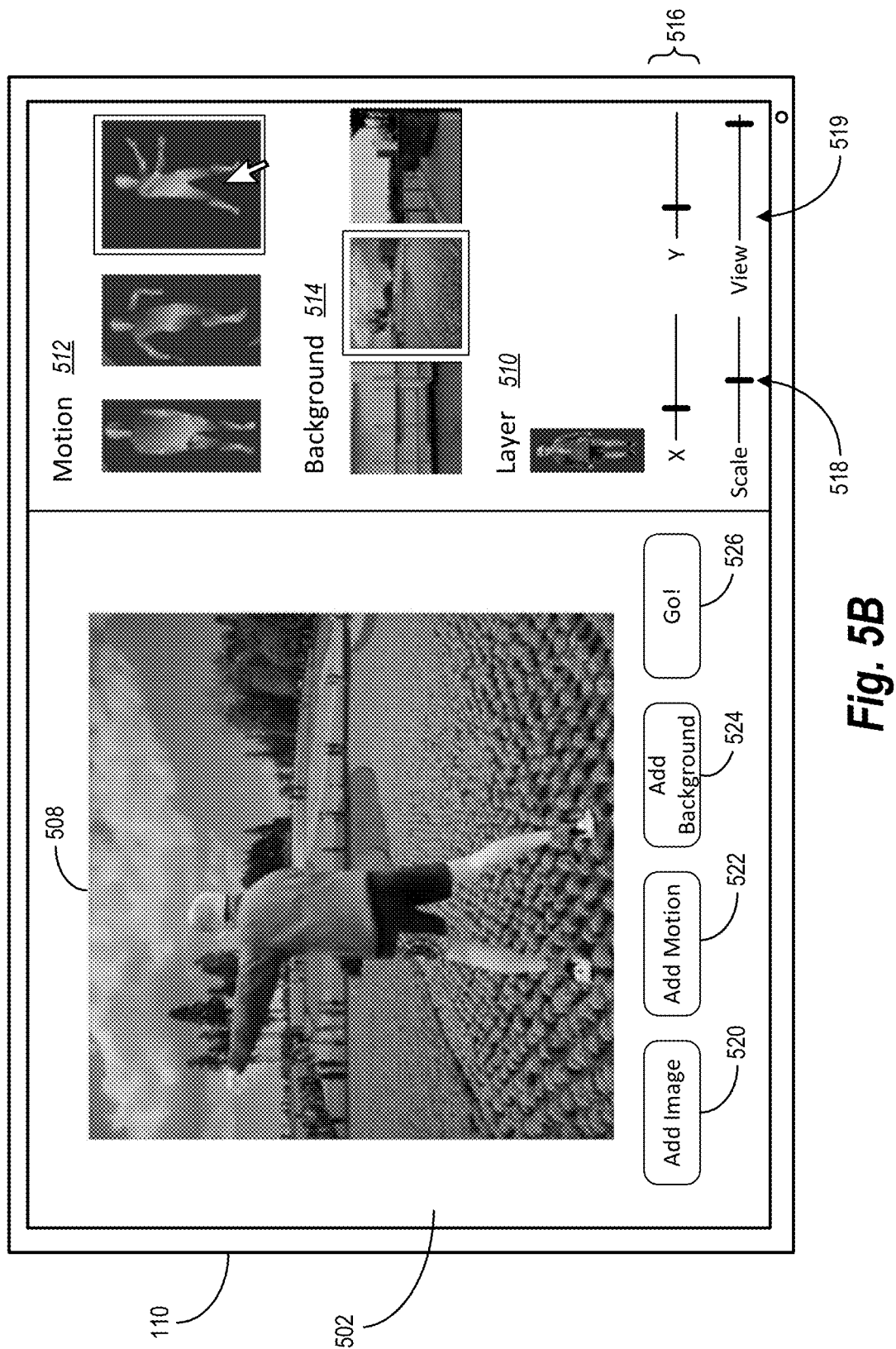

FIG. 5B illustrates the looping 3D animation interface 502 displaying a user interaction with the selectable element 519. In response to interactions with the selectable element 519, the looping 3D animation system 106 rotates the view of the person to display the animation of the person from the side or back viewpoint. Indeed, the looping 3D animation system 106 is able to rotate the view of the person to display the animation of the person from a full 360-degree field of view even though the input digital image is a 2D view showing only one view. For example, upon receiving a user selection of the selectable element 519 corresponding to a view of 90-degrees, the looping 3D animation interface 502 displays a looping 3D animation of the person from a side viewpoint. As another example, upon receiving a user selection of the selectable element 519 corresponding to a view of 180-degrees, the looping 3D animation interface 502 displays a looping 3D animation of the person from a back viewpoint. The looping 3D animation system 106 enables display of views of the person from previously unseen angles. Indeed, generating the looping 3D animation of the person comprises generating views of portions of the person not visible in the digital image. Furthermore, FIG. 5B illustrates how looping 3D animation system 106 rotates the looping 3D animation to present the looping 3D animation from different viewpoints in response to user input.

Figure 5C:
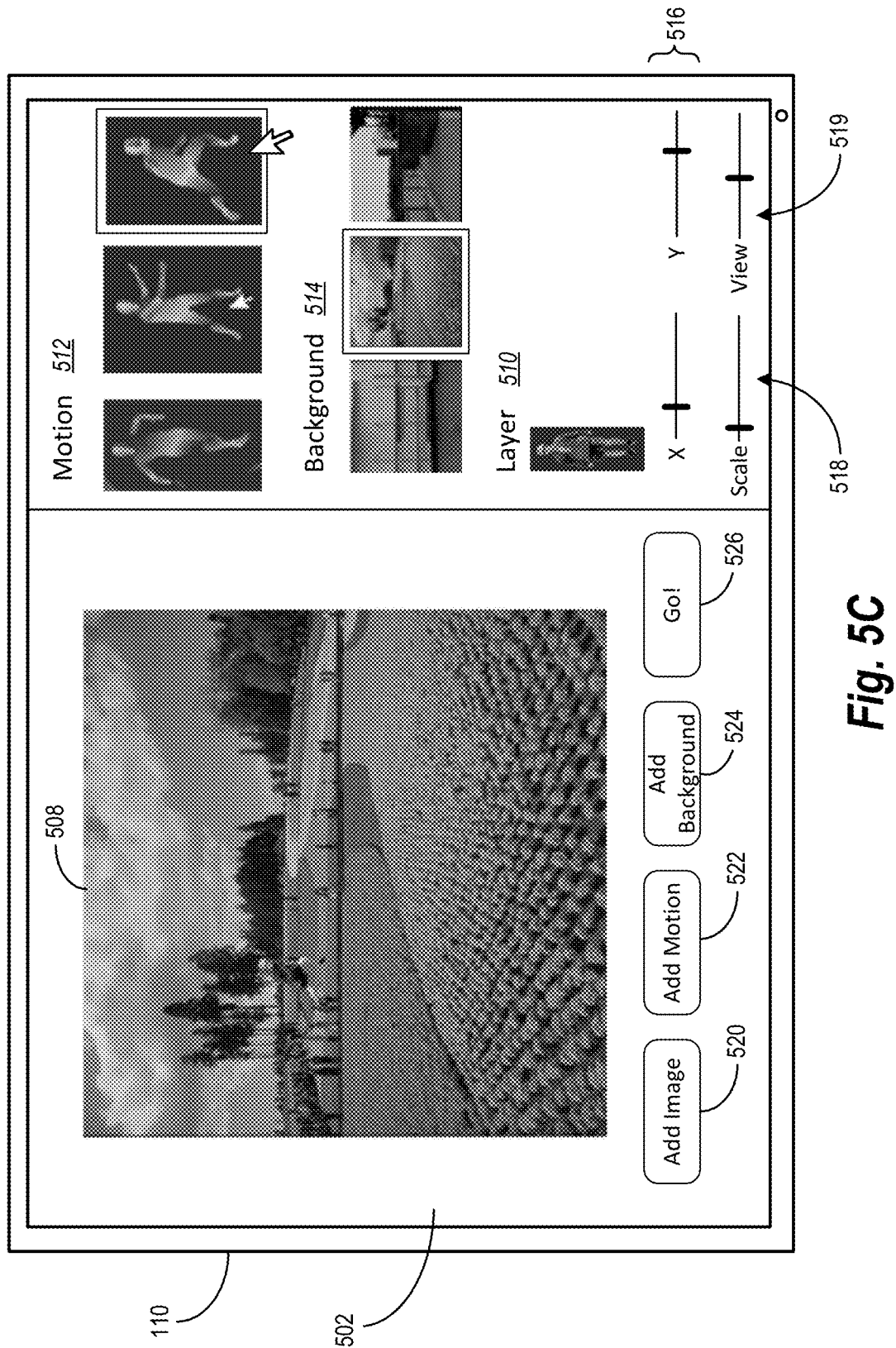

FIG. 5C illustrates the looping 3D animation interface 502 displaying a user interaction with the selectable elements 516 and selectable element 518. Indeed, in response to interactions with the selectable elements 516, the looping 3D animation system 106 moves the image of the animated person to another location within the background. In addition, in response to receiving an indication of an interaction with the selectable element 518, the looping 3D animation system 106 changes the size, or scale, of the image of the animated person. For example, upon receiving an indication of an interaction with the selectable elements 516 to move the person to a different location on the background image, the looping 3D animation interface 502 moves the person as shown in FIG. 5C. As also shown on FIG. 5C, upon receiving an indication of an interaction with the selectable element 518 to change the size of the person, the looping 3D animation interface 502 changes the size the person as shown (e.g., make the person smaller in relation to the background image).

Figure 5D:
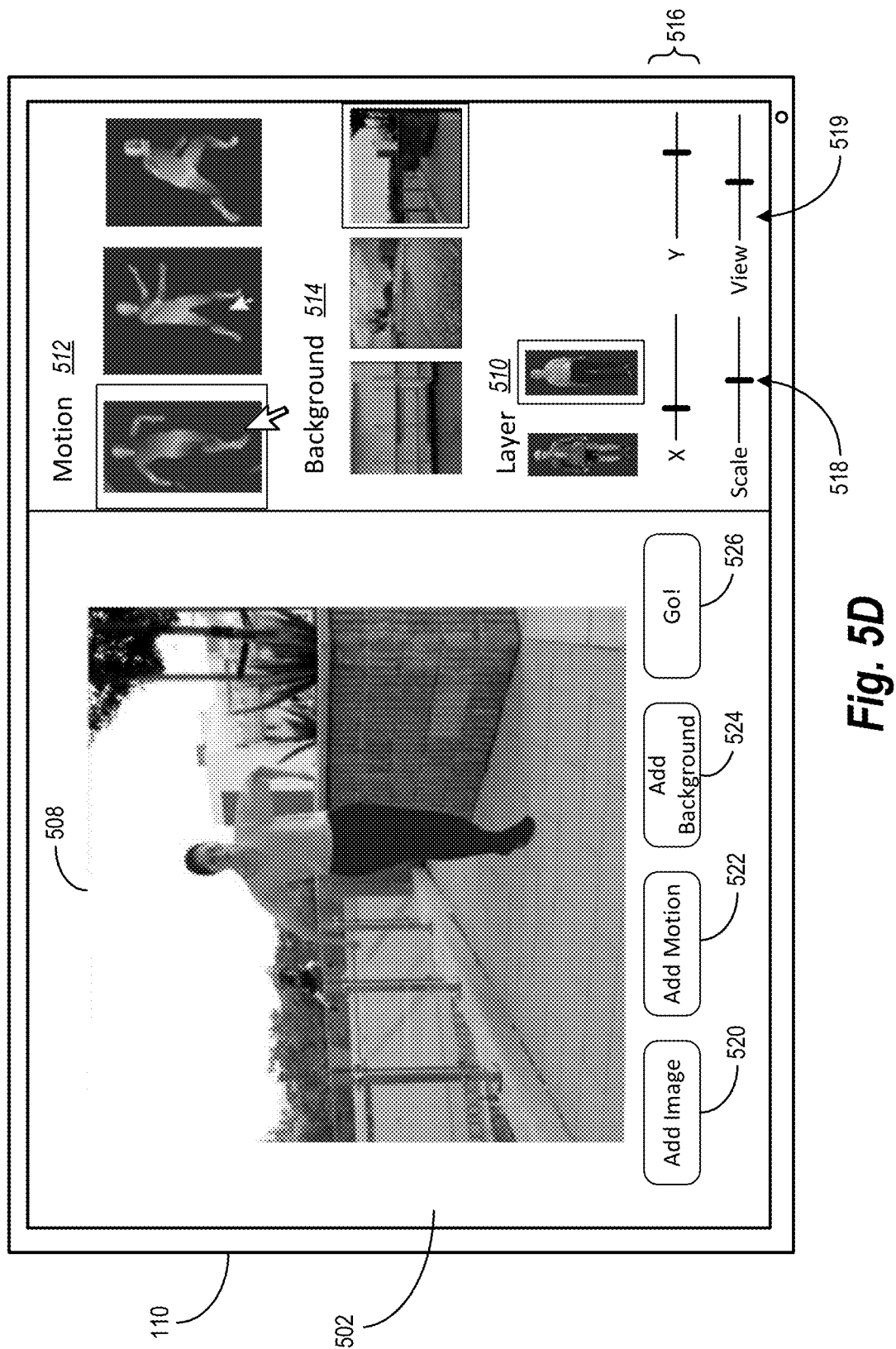

FIG. 5D illustrates the looping 3D animation interface 502 displaying images of multiple persons from multiple digital image sources. Indeed, the looping 3D animation system 106 provides the ability to display multiple (e.g., two, three, or more) animated persons simultaneously. For example, a user can select a first source from within the select source image portion 510 (and select corresponding attributes for the other selectable elements) and select a second source from within the select source image portion 510 (and select corresponding attributes for the other selectable elements). Indeed, the user can select different (or the same) attributes for each animated person. For example, as shown in FIG. 5D, the first animated person can be smaller, in a different location, and have a different movement type than the second animated person. As another example, the first animated person can have some, or all, of the same attributes as the second animated person. Indeed, the looping 3D animation system 106 allows a user to select and modify the attributes independently (or simultaneously) for each animated person as discussed above.

Figure 5E:
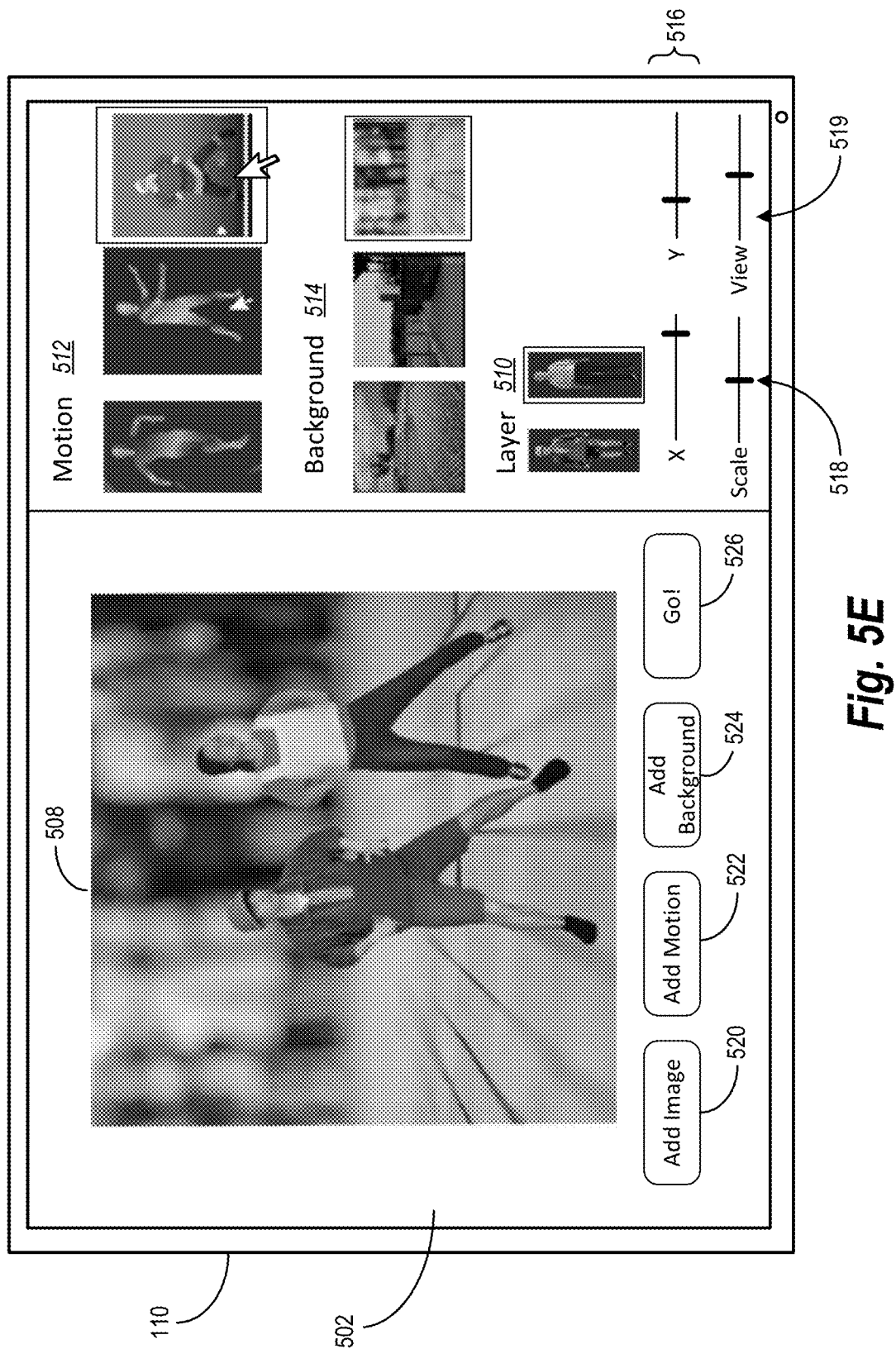

FIG. 5E illustrates the looping 3D animation interface 502 utilizing a video source to provide the target motion type. For example, based on detecting an interaction with the selectable element 522, the looping 3D animation interface 502 enables the selection of one or more input videos (e.g., via a drop-down menu or another selection method). In some implementations, the looping 3D animation system 106 provides various search and filtering tools within the select for selecting input videos. In various implementations, as shown in FIG. 5E, the looping 3D animation system 106 adds an image of the selected input video to the select motion type portion 512. As discussed above, the looping 3D animation system 106 generates and uses a target 3D animation motion type based on the selected input video source. Indeed, as shown on FIG. 5E, upon receiving an indication of a selection of the input video source in the select motion type portion 512, the looping 3D animation system 106 displays the person(s) in a looping 3D animation sequence using the target 3D animation motion type.

Figure 6:
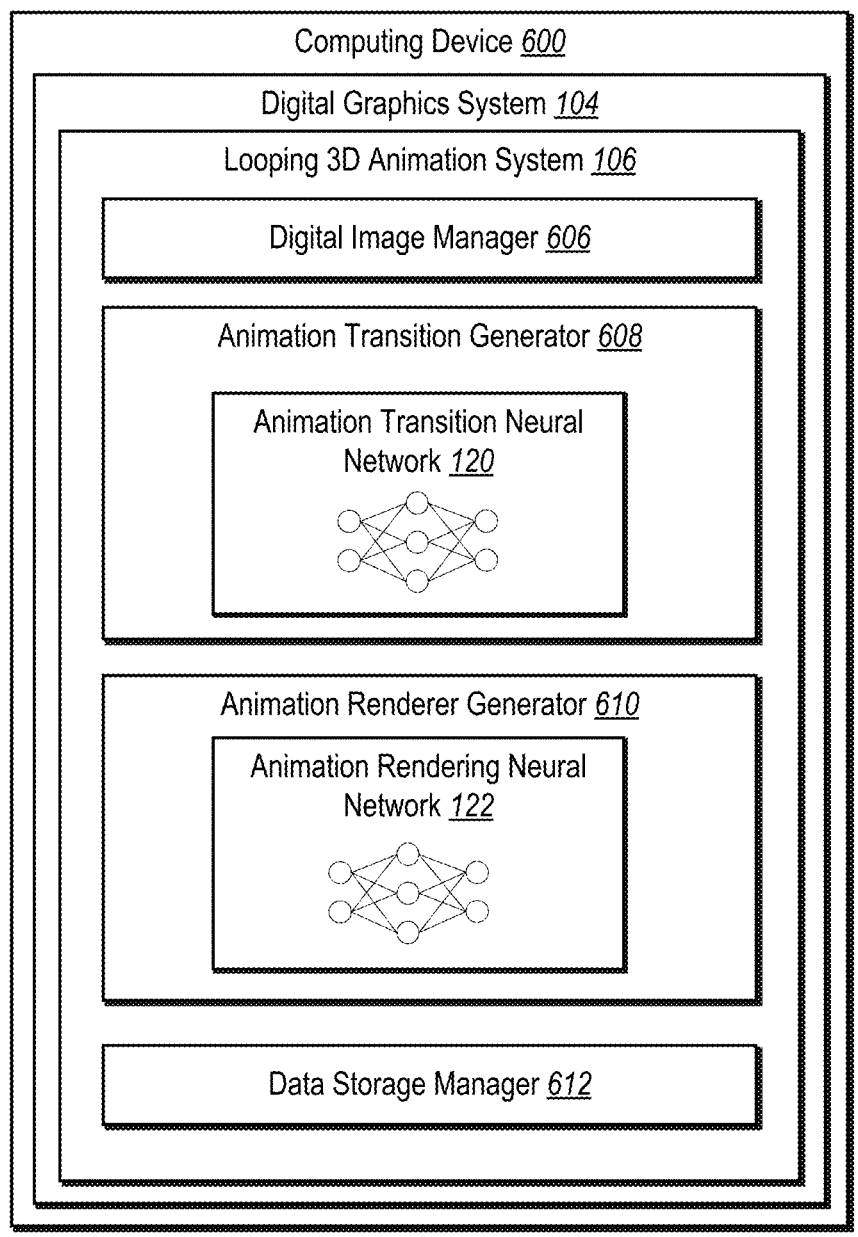
FIG. 6 illustrates an example architecture of the looping 3D animation system in accordance with one or more embodiments.

Turning now to FIG. 6, additional detail will be provided regarding components and capabilities of one or more embodiments of the looping 3D animation system 106. In particular, FIG. 6 illustrates an example looping 3D animation system 106 executed by a computing device 600 (e.g., the server devices(s) 102 or the client device 110). As shown by the embodiment of FIG. 6, the computing device 600 includes or hosts a digital graphics system 104 and the looping 3D animation system 106. Furthermore, as shown in FIG. 6, the looping 3D animation system 106 includes a digital image manager 606, an animation transition generator 608, an animation rendering generator 610, and a data storage manager 612.

As just mentioned, and as illustrated in the embodiment of FIG. 6, the looping 3D animation system 106 includes the digital image manager 606. For instance, the digital image manager 606 identifies, stores, transmits, and/or displays digital images (and/or digital videos) as described above (e.g., in relation to FIGS. 1-5). In some instances, the digital image manager 606 stores and maps looping 3D animation sequences as described above (e.g., in relation to FIGS. 1-5).

Furthermore, as shown in FIG. 6, the looping 3D animation system 106 includes the animation transition generator 608. For instance, the animation transition generator 608 comprises the animation transition neural network 120 described above. As also shown in FIG. 6, the looping 3D animation system 106 includes the animation rendering generator 610. For instance, the animation rendering generator 610 includes the animation rendering neural network 122 that performs neural rendering to generate a plausible 3D motion appearance. Additionally, the animation rendering generator 610 uses an equivariance model to model the dynamics of the secondary motion as a function of spatial and time derivative of the 3D body (e.g., in relation to FIG. 4).

In addition, as shown in FIG. 6, the looping 3D animation system 106 includes the data storage manager 612. In some embodiments, the data storage manager 612 is implemented by one or more memory devices. Additionally, in certain instances, the data storage manager 612 maintains data to perform one or more functions of the looping 3D animation system 106. For example, the data storage manager 612 includes digital images, cinemagraphs, training data, and/or generative neural network components (e.g., neural network parameters, neural network channel weights, GAN data, GAN parameters).

Each of the components 606-612 of the looping 3D animation system 106 can include software, hardware, or both. For example, the components 606-612 can include one or more instructions stored on a computer-readable storage medium and executable by processors of one or more computing devices, such as a client device or server device. When executed by the one or more processors, the computer-executable instructions of the looping 3D animation system 106 can cause the computing device 600 to perform the methods described herein. Alternatively, the components 606-612 can include hardware, such as a special-purpose processing device to perform a certain function or group of functions. Alternatively, the components 606-612 of the looping 3D animation system 106 can include a combination of computer-executable instructions and hardware.

Furthermore, the components 606-612 of the looping 3D animation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 606-612 may be implemented as a stand-alone application, such as a desktop or mobile application. Furthermore, the components 606-612 may be implemented as one or more web-based applications hosted on a remote server. The components 606-612 may also be implemented in a suite of mobile device applications or "apps." To illustrate, the components 606-612 may be implemented in an application, including but not limited to, ADOBE PHOTOSHOP, ADOBE PREMIERE, ADOBE LIGHTROOM, ADOBE ILLUSTRATORE, ADOBE SUBSTANCE, ADOBE CREATIVE CLOUD, or ADOBE SENSEI. "ADOBE," "ADOBE PHOTOSHOP," "ADOBE PREMIERE," "ADOBE LIGHTROOM," "ADOBE ILLUSTRATORE," "ADOBE SUBSTANCE," "ADOBE CREATIVE CLOUD," and "ADOBE SENSEI" are either registered trademarks or trademarks of Adobe Systems Incorporated in the United States and/or other countries.

Figure 7:
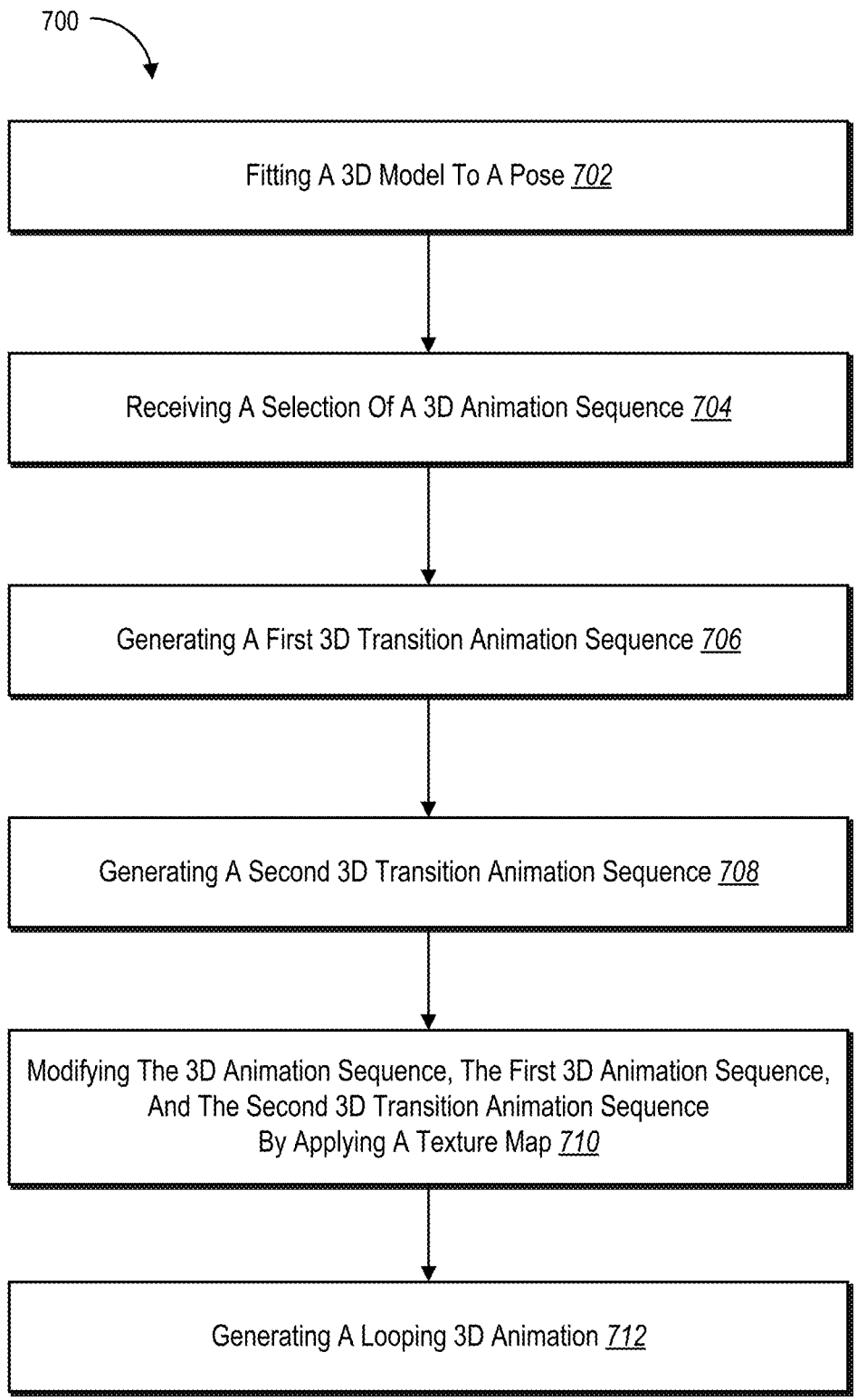
FIG. 7 illustrates a flowchart of a series of acts for utilizing a looping 3D animation system to generate a looping 3D animation in accordance with one or more embodiments.

FIGS. 1-6, the corresponding text, and the examples provide a number of different methods, systems, devices, and non-transitory computer-readable media of the looping 3D animation system 106. In addition to the foregoing, one or more embodiments can also be described in terms of flowcharts comprising acts for accomplishing a particular result, as shown in FIG. 7. The acts shown in FIG. 7 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 7. In some embodiments, a system can be configured to perform the acts of FIG. 7. Alternatively, the acts of FIG. 7 can be performed as part of a computer implemented method.

As mentioned above, FIG. 7 illustrates a flowchart of a series of acts 700 for generating a cinemagraph in accordance with one or more implementations. While FIG. 7 illustrates acts according to one embodiment, alternative embodiments may omit, add to, reorder, and/or modify any of the acts shown in FIG. 7.

FIG. 7 illustrates an example series of acts 700 for utilizing a looping 3D animation system to generate a looping 3D animation in accordance with one or more embodiments. In particular, the series of acts 700 includes an act 702 of fitting a 3D model to a pose. Specifically, the act 702 includes fitting a three-dimensional ("3D") model to a pose of a person in a digital image.

As illustrated, the series of acts 700 also includes an act 704 of receiving a selection of a 3D animation sequence. In particular, the act 704 includes receiving a selection of a 3D animation sequence that transitions between a starting pose and an ending pose. Additionally, the act 704 also includes selecting the 3D animation sequence comprises selecting a target motion type from a selection of different motion types. The act 704 further comprises receiving a source animation comprising a person in motion, generating a target 3D animation sequence that models movement of the person in the source animation and transitions between a source starting pose and a source ending pose; and selecting the target 3D animation sequence as the 3D animation sequence.

Moreover, as shown in FIG. 7, the series of acts 700 includes the act 706 generating a first 3D animation transition sequence. In particular, the act 706 includes generating, utilizing an animation transition neural network, a first 3D animation transition sequence of the 3D model that transitions between the ending pose and the pose of the person in the digital image. For example, the act 706 includes generating a 3D animation sequence that matches the target motion type.

As illustrated, the series of acts 700 also includes an act 708 of generating a second 3D animation transition sequence. In particular, the act 708 includes generating, utilizing an animation transition neural network, a second 3D animation transition sequence of the 3D model that transitions between the pose of the person in the digital image and the ending pose.

As illustrated, the series of acts 700 also includes an act 710 of modifying the 3D animation sequence, first 3D animation transition sequence, and the second 3D animation transition sequence by applying a texture map. In particular, the act 710 includes modifying, utilizing an animation rendering neural network, each of the 3D animation sequence, the first 3D animation transition sequence, and the second 3D animation transition sequence by applying a texture map of the person to each animation sequence.

Furthermore, the series of acts 700 also include an act 712 of generating a looping 3D animation. In particular, the act 712 includes generating a looping 3D animation by combining the modified 3D animation sequence, the modified first 3D animation transition sequence, and the modified second 3D animation transition sequence. For example, the act 712 includes rendering a texture map using a multi-task compositional renderer to predict time-varying semantic maps and surface normal maps.

In addition (or in the alternative) to the acts described above, the looping 3D animation system 106 also performs the act of displaying the looping 3D animation on a selected background image. In some implementations, the looping 3D animation system 106 perform the acts of generating a second looping 3D animation and displaying the looping 3D animation and the second looping 3D animation on the selected background image. Additionally, in one or more embodiments, the looping 3D animation system 106 performs the act of rotating the looping 3D animation to present the looping 3D animation from a different viewpoint.

Moreover, in one or more embodiments, the looping 3D animation system 106 performs the act of generating a looping 3D animation by: combining the 3D animation sequence, the first 3D animation transition sequence, and the second 3D animation transition sequence into a combined 3D animation sequence; predicting time-varying semantic maps specific to the person in the digital image of the combined 3D animation sequence; predicting surface normal maps specific to the person in the digital image of the combined 3D animation sequence; and synthesizing texture maps from the time-varying semantic maps and surface normal maps to define an appearance of the person in the combined 3D animation sequence.

Further still, in some embodiments, predicting surface normal maps specific to the person in the digital image of the combined 3D animation sequence comprises generating a spatial derivative of the pose of the person in the digital image. Moreover, in one or more embodiments, predicting time-varying semantic maps specific to the person in the digital image of the combined 3D animation sequence comprises encoding spatial and temporal gradients to model a time-varying appearance for secondary motion that depends on both body pose and motion.

Moreover, in one or more embodiments, the looping 3D animation system 106 performs the act of generating a second looping 3D animation wherein the second looping 3D animation comprises a second person and displaying the looping 3D animation and the second looping 3D animation on the selected background image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
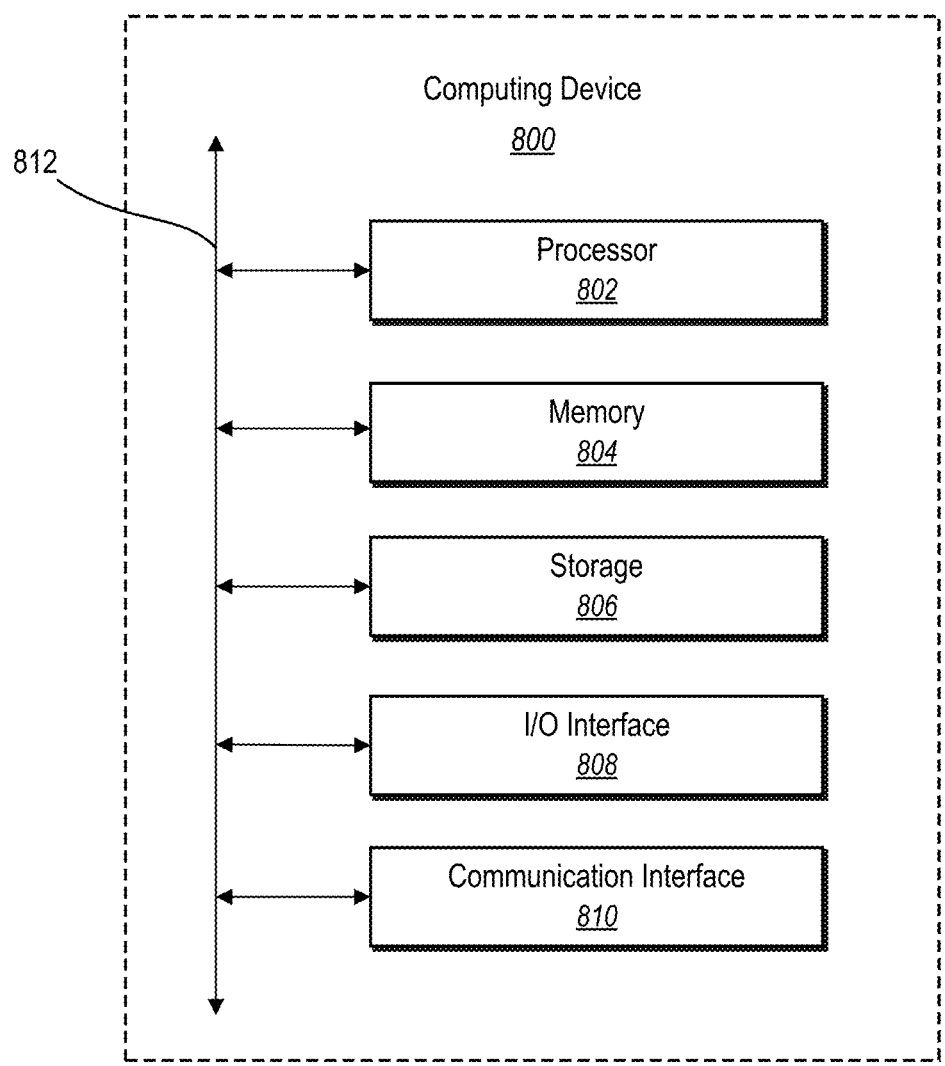
FIG. 8 illustrates a block diagram of an example computing device in accordance with one or more embodiments.

FIG. 8 illustrates, in block diagram form, an example computing device 800 (e.g., the computing device 600, the client device 110, and/or the server device(s) 102) that may be configured to perform one or more of the processes described above. One will appreciate that the looping 3D animation system 106 can comprise implementations of the computing device 800. As shown by FIG. 8, the computing device can comprise a processor 802, memory 804, a storage device 806, an I/O interface 808, and a communication interface 810. Furthermore, the computing device 800 can include an input device such as a touchscreen, mouse, keyboard, etc. In certain embodiments, the computing device 800 can include fewer or more components than those shown in FIG. 8. Components of computing device 800 shown in FIG. 8 will now be described in additional detail.

In particular embodiments, the processor 802 includes hardware for executing instructions, such as those making up a computer program. As an example, and not by way of limitation, to execute instructions, the processor 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 includes a storage device 806 which includes storage for storing data or instructions. As an example, and not by way of limitation, storage device 806 can comprise a non-transitory storage medium described above. The storage device 806 may include a hard disk drive (HDD), flash memory, a Universal Serial Bus (USB) drive or a combination of these or other storage devices.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a writing device or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
fitting a three-dimensional ("3D") model to a pose of a person in a digital image;
receiving, from a graphical user interface of a client device, a selection of a 3D animation sequence that transitions between a starting pose and an ending pose;
generating, utilizing an animation transition neural network, a first 3D animation transition sequence of the 3D model that transitions between the pose of the person in the digital image and the starting pose;
generating, utilizing the animation transition neural network, a second 3D animation transition sequence of the 3D model that transitions between the ending pose and the pose of the person in the digital image;
modifying, utilizing an animation rendering neural network, each of the 3D animation sequence, the first 3D animation transition sequence, and the second 3D animation transition sequence by applying a texture map of the person to each animation sequence; and
generating, for display on the graphical user interface, a looping 3D animation by combining the modified 3D animation sequence, the modified first 3D animation transition sequence, and the modified second 3D animation transition sequence.

2. The method of claim 1, wherein receiving the selection of the 3D animation sequence that transitions between the starting pose and the ending pose comprises receiving a selection of a 3D animations sequence from an animation repository.

3. The method of claim 1, wherein receiving the selection of the 3D animation sequence that transitions between the starting pose and the ending pose comprises:
receiving a selection of a video of a person performing a movement sequence; and
fitting a 3D model to the person in various frames of the video to generate the 3D animation sequence.

4. The method of claim 1, further comprising:
generating a second looping 3D animation; and
displaying the looping 3D animation and the second looping 3D animation together on a background image.

5. The method of claim 1, wherein receiving the selection of the 3D animation sequence comprises receiving a selected target motion type from a plurality of different motion types displayed in the graphical user interface.

6. The method of claim 5, wherein generating the first 3D animation transition sequence comprises generating a first 3D animation transition sequence to have the selected target motion type.

7. The method of claim 5, wherein the selected target motion type is dancing.

8. The method of claim 1, wherein generating, utilizing the animation transition neural network, the first 3D animation transition sequence of the 3D model that transitions between the pose of the person in the digital image and the starting pose comprises performing neural inbetweening.

9. A system comprising:
a memory component; and
one or more processing devices coupled to the memory component, the one or more processing devices to perform operations comprising:
fitting a three-dimensional ("3D") model to a pose of a person in a digital image;
receiving a selection of a 3D animation sequence that transitions between a starting pose and an ending pose;
generating a first 3D animation transition sequence that transitions between the pose of the person in the digital image and the starting pose;
generating a second 3D animation transition sequence that transitions between the pose of the person in the digital image and the ending pose; and
generating a looping 3D animation of the person by:
combining the 3D animation sequence, the first 3D animation transition sequence, and the second 3D animation transition sequence into a combined 3D animation sequence;
synthesizing texture maps providing an appearance of the person on the combined 3D animation sequence; and
rendering the texture maps on the combined 3D animation sequence.

10. The system of claim 9, wherein generating the first 3D animation transition sequence that transitions between the pose of the person in the digital image and the starting pose comprises generating a plurality of sequential poses of a 3D model that transition from the pose of the person in the digital image to the starting pose.

11. The system of claim 9, wherein generating the second 3D animation transition sequence that transitions between the pose of the person in the digital image and the ending pose comprises generating a plurality of sequential poses of a 3D model that transition from the ending pose to the pose of the person in the digital image.

12. The system of claim 9, further comprising:
receiving a selection of a background; and
compositing the looping 3D animation on the selected background.

13. The system of claim 9, wherein generating the looping 3D animation of the person comprises generating views of portions of the person not visible in the digital image.

14. The system of claim 9, wherein synthesizing the texture maps providing the appearance of the person on the combined 3D animation sequence comprises synthesizing motion-dependent texture that models wrinkles and shade in a motion dependent manner.

15. The system of claim 9, wherein generating the looping 3D animation is performed in response to user selection of the 3D animation sequence without further user input.

16. A non-transitory computer-readable medium storing executable instructions which, when executed by a processing device, cause the processing device to perform operations comprising:
fitting a three-dimensional ("3D") model to a pose of a person in a digital image;
receiving a selection of a 3D animation sequence that transitions between a starting pose and an ending pose;
generating, utilizing an animation transition neural network, a first 3D animation transition sequence that transitions between the pose of the person in the digital image and the starting pose;
generating, utilizing the animation transition neural network, a second 3D animation transition sequence that transitions between the pose of the person in the digital image and the ending pose; and
generating, utilizing an animation rendering neural network, a looping 3D animation by rendering a texture map specific to the person in the digital image to the 3D animation sequence, the first 3D animation transition sequence, and the second 3D animation transition sequence.

17. The non-transitory computer-readable medium of claim 16, wherein the operations further comprise:
receiving a selection of a background image;
sizing the looping 3D animation based on the selected background image; and
displaying the sized looping 3D animation on the selected background image.

18. The non-transitory computer-readable medium of claim 17, wherein the operations further comprise:
generating a second looping 3D animation including a second 3D animation sequence that differs from the 3D animation sequence; and
displaying the looping 3D animation and the second looping 3D animation together on the selected background image.

19. The non-transitory computer-readable medium of claim 16, wherein receiving the selection of the 3D animation sequence comprises receiving a selection of a target motion type from a plurality of different motion types.

20. The non-transitory computer-readable medium of claim 16, wherein the operations further comprise rotating the looping 3D animation to present the looping 3D animation from different viewpoints in response to user input.

* * * * *